United States Patent Office 2,891,082
Patented June 16, 1959

2,891,082
DERIVATIVES OF ASPARTAMIDES

Alfred F. Steinhauer and Edward P. Merica, Midland, Mich., assignors to The Dow Chemical Company, Midland, Mich., a corporation of Delaware No Drawing. Application June 2, 1958
Serial No. 738,938

6 Claims. (Cl. 260—404.5)

The present invention relates to new and useful aspartamides and is more particularly concerned with the new and useful long-chain fatty acid derivatives of aspartamides having the general formula

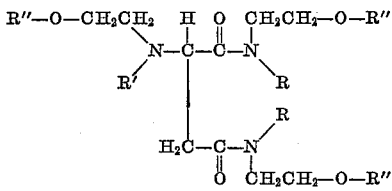

wherein each R is an independently selected member of group consisting of hydrogen, hydroxyethyl, and —CH₂CH₂—O—R″, R′ is a member selected from the group consisting of R and —R″, and R″ is an acyl radical of a fatty acid containing from 8–22 carbon atoms, inclusive. The new compounds have been tested and found to be effective as emulsifiers for use with oil and water mixtures for drilling oil wells, for use with organic chlorides and water in paint stripping compositions, for use with organic waxes and water in polish compositions, and the like.

The compounds of the present invention may be prepared by reacting a poly(hydroxyethyl)aspartamide and three or more molecular equivalents of a long chain fatty acid or acid chloride.

In one manner of carrying out the present invention to obtain, for example, a triacyloxyethylaspartamide, N,N′N″-tris(2-hydroxyethyl)aspartamide is reacted with three molecular equivalents of a long-chain fatty acid or acid chloride. The reaction proceeds smoothly with stirring and at the temperatures of from 80° to 160° centigrade and at pressures of from about 1 millimeter of mercury to about atmospheric pressure. The compounds, usually solids, are recovered from the reaction mixture as the residue remaining after the water or HCl of reaction has been evolved. It is thus apparent that when the degree of acylation desired is more than three it is merely necessary to increase the molecular proportion of long-chain fatty acid or chloride to 4 or more. Further, if a penta- or hexa-ester is desired, it is necessary to start with a penta- or hexakis(2-hydroxyethyl)aspartamide and react the same with 5 or 6 moles of the long-chain fatty acid or acid chloride. Frequently it is desirable to acylate fewer than all of the hydroxy groups. Thus, the tri- or tetra-ester of penta- or hexakis(2-hydroxyethyl)aspartamide is readily made by the use of the reactants in the theoretically required molar ratio.

The following examples illustrate the present invention but are not to be construed as limiting.

Example 1

120 parts by weight (0.456 mole) of N,N′N″-tris-(2-hydroxyethyl)aspartamide and 530 parts (1.825 moles) of tall oil fatty acid are mixed together. The pressure is lowered to 1 millimeter of mercury and the temperature slowly raised to about 100° C. The reaction mixture is continuously stirred. Upon completion of the reaction as evidenced by the substantial cessation of the formation of water, the reaction mass is returned to atmospheric pressure and temperature. The product, a tall oil fatty acid triester of N,N′N″-tris(2-hydroxyethyl)aspartamide tall oil amide is a waxy solid at room temperature and has an average molecular weight of 1331. It has the formula

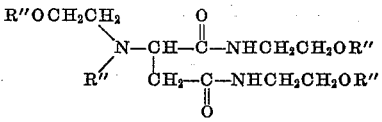

wherein R″ represents the acyl radical of tall oil fatty acid.

Example 2

65.8 parts by weight of N,N′N″-tris(2-hydroxyethyl)aspartamide and 228.5 parts of lauroyl chloride are mixed together and heated at 135° C. for 10 hours at atmospheric pressure. Upon completion of the reaction there is obtained a waxy solid product identified as the tetralauroyl derivative of N,N′,N″-tris(2-hydroxyethyl)aspartamide.

In a similar manner, substituting the appropriate fatty acid or acid chloride for the lauroyl chloride of Example 2, a hexahydroxyethylaspartamide for the tris-aspartamide, and employing various molecular equivalents thereof the following polyesters are obtained:

N,N,N′,N′,N″,N″ - hexakis(hydroxyethyl)aspartamide hexa-(tall oil acid ester) by reacting hexahydroxyethylaspartamide and six equivalents of tall oil fatty acid.

N,N,N′,N′,N″,N″ - hexakis(hydroxyethyl)aspartamide tetrastearate by reacting hexahydroxyethylaspartamide and 4 moles of stearic acid.

It is to be understood that long-chain fatty acids other than tall oil acid, stearic acid and lauryl acid may be employed. Thus, for example, caprylic, pelargonic, capric, undecylenic, tridecanoic, myristic, palmitic, margaric, arachidic, oleic, or linoleic acid or the corresponding acid chlorides, anhydrides or lower alkyl esters, and the like, may be employed.

The compounds of the present invention are useful as emulsifying agents for many organic-water compositions. The products of the present invention were employed as emulsifiers in the following compositions:

I 7.6 g. No. 2 diesel oil
11.8 g. saturated salt solution
0.44 g. ester from hexakis(hydroxyethyl)aspartamide and 6 moles of tall oil fatty acid.

Forms emulsion for use in drilling oil wells.

II 10.0 g. methylene chloride
8.0 g. water
2.0 g. ester from tris(hydroxyethyl)aspartamide and 4 moles of stearoyl chloride.

Forms emulsion for use in stripping paint.

III 15.96 g. water
3.48 g. carnauba wax
0.52 g. ester from hexakis(hydroxyethyl)aspartamide and 3 moles of stearic acid.

Forms emulsion for use as floor polish, etc.

IV 15.96 g. water
3.48 g. carnauba wax
0.52 g. ester from N,N′,N″-tris(2-hydroxyethyl)aspartamide and 4 moles of tall oil fatty acid.

Forms emulsion for use as floor polish, etc.

We claim:

1. A compound having the formula

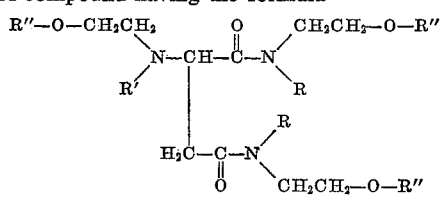

wherein each R is an independently selected member of the group consisting of hydrogen, hydroxyethyl, and —CH$_2$CH$_2$—O—R″, R′ is a member selected from the group consisting of R and —R″; and R″ is an acyl radical of a fatty acid containing from 8 to 22 carbon atoms, inclusive.

2. A composition as set forth in claim 1, wherein R is hydrogen and R′ and R″ are acyl radicals of tall oil fatty acid.

3. A composition as set forth in claim 1, wherein R is hydrogen and R′ and R″ are stearoyl.

4. A composition as set forth in claim 1, wherein R is hydrogen and R′ and R″ are lauroyl.

5. A composition as set forth in claim 1, wherein R and R′ are CH$_2$CH$_2$OR″ and R″ is talloyl.

6. A composition as set forth in claim 1, wherein R and R′ are CH$_2$CH$_2$OH and R″ is stearoyl.

No references cited.